W. H. BUSSEY.
PLANTING BOX.
APPLICATION FILED APR. 29, 1918.

1,300,245.

Patented Apr. 15, 1919.
2 SHEETS—SHEET 1.

Witnesses
A. H. Opsahl
E. C. Wells

Inventor
Wm. H. Bussey
By his Attorneys
Williamson Merchant

W. H. BUSSEY.
PLANTING BOX.
APPLICATION FILED APR. 29, 1918.
1,300,245.
Patented Apr. 15, 1919.
2 SHEETS—SHEET 2.
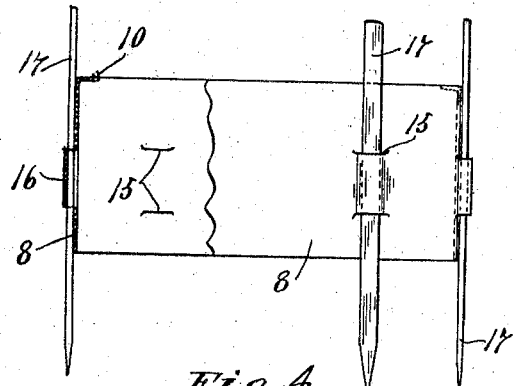
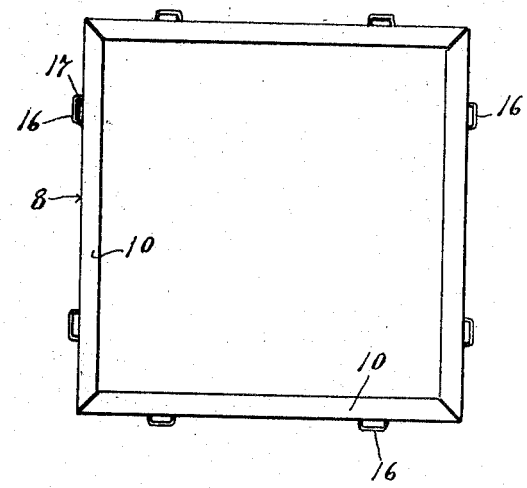
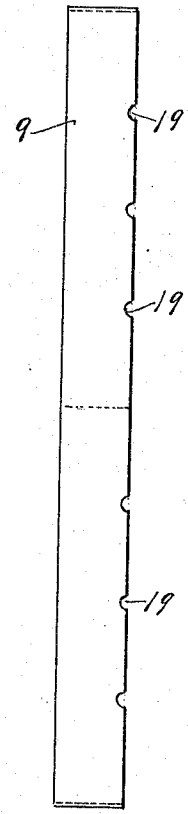
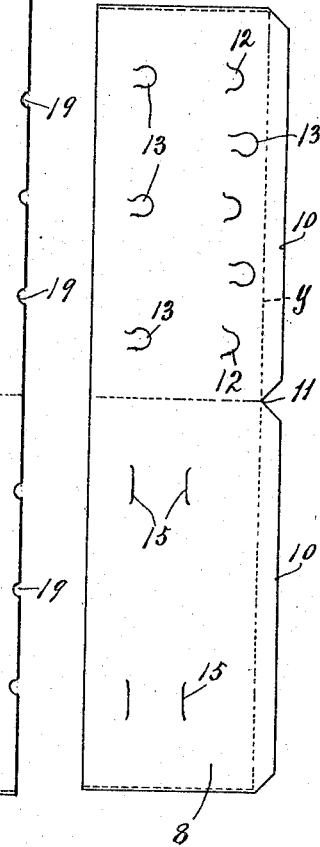
Witnesses.
A. H. Opsahl
E. C. Wells
Inventor.
Wm H. Bussey.
By his Attorneys.
Williamson Merchant

UNITED STATES PATENT OFFICE.

WILLIAM H. BUSSEY, OF MINNEAPOLIS, MINNESOTA.

PLANTING-BOX.

1,300,245. Specification of Letters Patent. Patented Apr. 15, 1919.

Application filed April 29, 1918. Serial No. 231,321.

*To all whom it may concern:*

Be it known that I, WILLIAM H. BUSSEY, a citizen of the United States, residing at Minneapolis, in the county of Hennepin and State of Minnesota, have invented certain new and useful Improvements in Planting-Boxes; and I do hereby declare the following to be a full, clear, and exact description of the invention, such as will enable others skilled in the art to which it appertains to to make and use the same.

My invention has for its object to provide an efficient inexpensive planting box; and to such ends, generally stated, the invention consists of the novel devices and combinations of devices hereinafter described and defined in the claims.

In accordance with my invention, the box is preferably made of heavy cardboard or pasteboard, such as used for making heavy cardboard boxes, and hence, assumed to be made at a box factory where such boxes are made. The box comprises a rectangular body and a rectangular rim, both of which are adapted to be folded flat, and hence, packed in very small space for shipping or storage. The arrangement is such that either a glass plate or a protecting cover of thin cloth, such as cheese cloth, may be secured over the plate to protect the same. The nature of the invention will more fully appear from the description of the preferred form of the device illustrated in the accompanying drawings.

In the said drawings, like characters indicate like parts throughout the several views.

Referring to the drawings:

Fig. 4 is a plan view of the rectangular body of the box showing also certain anchoring stakes;

Fig. 5 is a side elevation of the parts shown in Fig. 3, with some parts sectioned and some parts broken away;

Fig. 6 is a plan view showing the body of the box folded flat; and

Fig. 7 is a plan view of the rim of the box showing the same folded flat.

Figure 3:
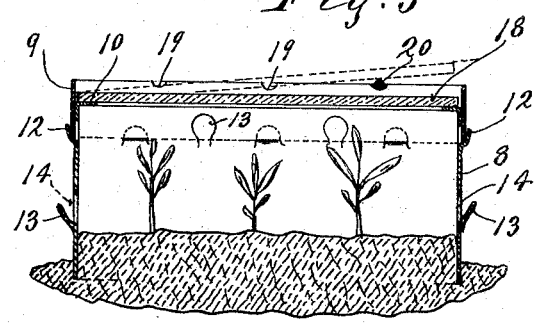
Fig. 3 is a transverse vertical section taken on the line 3—3 of Fig. 1, and showing the box in use.

The rectangular body 8 of the box is, as stated, preferably made of heavy cardboard, and the rectangular rim 9 is of like construction but is of much less vertical dimension than the body. The rim is adapted to telescope over the body of the box. The body of the box is formed with marginal portions adapted to be bent over on the dotted lines marked $y$ on Fig. 6, to form plate supporting flanges 10. This body 8 is adapted to be folded flat on diagonally opposite corners, as shown in Fig. 6, and to facilitate the bending over of the flanges 10, the upper edge of the box is provided with notches 11 at its corners. The rim 9 is also adapted to be folded flat on diagonally opposite corners as shown in Fig. 7. The rim 9 will fit over the box with some friction which will easily serve to hold the same in proper position, but to positively hold the same projected above the flanges 10 of the body, the said body is shown as formed with outwardly pressed lips 12. Also, the body of the box is shown as preferably provided with lips 13 cut from the box except for attaching neck portions and adapted to be pressed outward to afford ventilating capacity 14. (See particularly Fig. 3). Moreover, in the body of the box, in its sides, is formed vertically spaced pairs of slits 15 that adapt intervening portions to be pressed outward, as best shown in Fig. 5, to afford stake holding yokes 16 for thin anchoring stakes 17. These stakes 17, when driven into the ground, firmly anchor the body of the box to the ground and hold the same in its rectangular formation.

The inturned flanges 10 of the body of the box are adapted to support a glass plate 18, and the upwardly projecting portion of the rim 9 surrounds the edge of the plate 18 and holds the same in position. Preferebly, the upper edge of the rim 9 is formed with notches 19 in which a small transverse pin or rod 20 is adapted to be seated to hold the glass plate 18 slightly raised or inclined, as shown by dotted lines in Fig. 3, when ventilation is desired, as in extremely warm weather when there would be danger of burning the plants.

Figure 1:
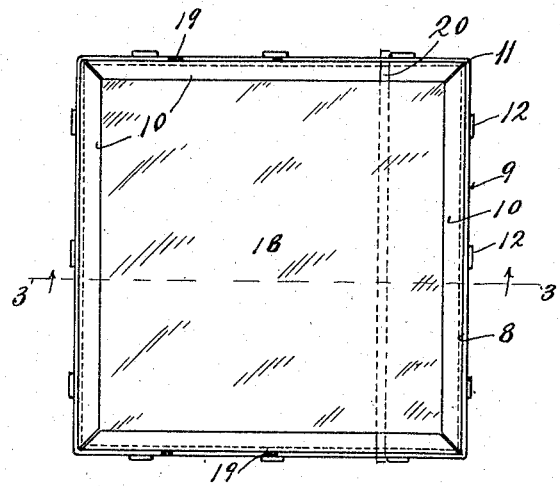
Figure 1 is a plan view of the planting box.
Figure 2:
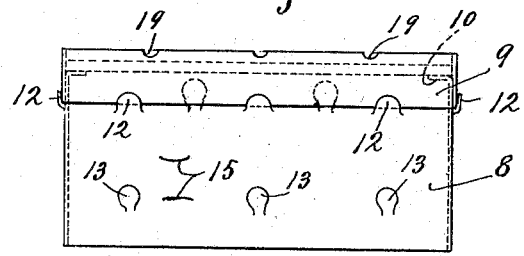
Fig. 2 is a side elevation thereof.

At times, it will be advisable to remove the glass plate 18 and to apply a sheet of cheese cloth, or the like, to cover the top of the box. This sheet of cheese cloth can be placed over the upper edge of the box 8 and held in position by forcing the rim 9 downward over the box and over the edges of the said sheet, thus frictionally but securely holding the said sheet stretched across the top of the box. At such times, or at any other time, the rim can be raised higher than shown in Figs. 2 and 3, and frictionally held in position, and when the said rim is raised, the upper ventilating ports 18 can be opened up. In the position of the rim shown in Figs. 2 and 3, the upper ventilating ports are closed by the rim.

Both the body and rim of the box can be made from cardboard, may be stamped out in large quantities and manufactured very cheaply in any box factory equipped for the making of paper boxes, or the like.

What I claim is:

1. A planting box comprising a body member provided with inturned edges to support a protecting cover that will pass light to the interior of the box, and a rim telescopically slidable onto the upper end of said body member to hold said cover in position.

2. A planting box comprising an angular body member having inturned upper edge flanges, and an angular member telescoped over said body member but projecting above the same, and a glass plate rested on said flanges and held in position by said rim.

3. A planting box comprising a body member provided with inturned edge flanges to support a plate, and a rim telescopically rotatable onto the upper end of said body to hold said plate in position, said body member having inturned lips for limiting the downward movement of said rim on said body, and said body member having partially severed lips adapted to be pressed laterally to afford ventilation when desired.

4. A planting box comprising an angular body member having inturned upper edge flanges, and an angular member telescoped over said body member but projecting above the same, and a glass plate rested on said flanges and held in position by said rim, the said body and rim being foldable flatwise on their diagonally opposite corner joints.

5. A planting box comprising an angular body member having inturned upper edge flanges, and an angular member telescoped over said body member but projecting above the same, and a glass plate rested on said flanges and held in position by said rim, the said body and rim being foldable flatwise on their diagonally opposite corner joints, the said rim, in its upper edge, having notches for supporting a rod to hold the glass plate in a partly open position.

In testimony whereof I affix my signature in presence of two witnesses.

WILLIAM H. BUSSEY.

Witnesses:
HARRY D. KILGORE,
F. D. MERCHANT.